United States Patent [19]

Minarik et al.

[11] Patent Number: 4,563,958
[45] Date of Patent: Jan. 14, 1986

[54] FURNACE CHARGE PREHEATER

[75] Inventors: Ferdinand Minarik, Karlstein; Hans-Joachim Paletzki, Viersen, both of Fed. Rep. of Germany

[73] Assignee: Fuchs Systemtechnik GmbH, Fed. Rep. of Germany

[21] Appl. No.: 541,422

[22] Filed: Oct. 13, 1983

[30] Foreign Application Priority Data

Oct. 13, 1982 [DE] Fed. Rep. of Germany ....... 3238017

[51] Int. Cl.⁴ .............................................. F23G 5/02
[52] U.S. Cl. .................................... 110/219; 266/901; 432/9; 432/101; 432/162; 432/241
[58] Field of Search ........................ 110/218, 219, 236; 432/9, 101, 162, 241; 266/901; 373/80

[56] References Cited

U.S. PATENT DOCUMENTS

| | | | |
|---|---|---|---|
| 3,180,724 | 4/1965 | Brooke | 432/101 |
| 3,336,020 | 8/1967 | Palsak | 266/901 |
| 3,771,775 | 11/1973 | Reinbold et al. | 266/901 |
| 3,852,028 | 12/1974 | Reinbold et al. | 266/901 |
| 4,262,825 | 4/1981 | Jacobson et al. | 432/241 |
| 4,299,566 | 11/1981 | Venetta | 432/241 |
| 4,373,911 | 2/1983 | Date et al. | 432/162 |
| 4,395,280 | 7/1983 | Takenouchi et al. | 432/9 |
| 4,408,986 | 10/1983 | Soroya et al. | 432/9 |

Primary Examiner—Albert J. Makay
Assistant Examiner—Steven E. Warner

[57] ABSTRACT

In a furnace charge preheater, especially one for scrap metal, in the form of a bucket whose bottom contains at least two outswinging half-shells, the bucket bottom when in the closed state is formed of a central part and at least one ring while the inner margin of the ring overlaps the margin of the central part and the margin of the central part is situated at a distance below the inner margin of the ring thus forming an annular gap. In this manner a more uniform flow of the hot gas through the preheater is assured. Furthermore, if the annular gap between the bucket bottom and the bucket wall is sealed up, the chamber on which the charge preheater is placed when the charge is preheated, can be made smaller.

8 Claims, 1 Drawing Figure

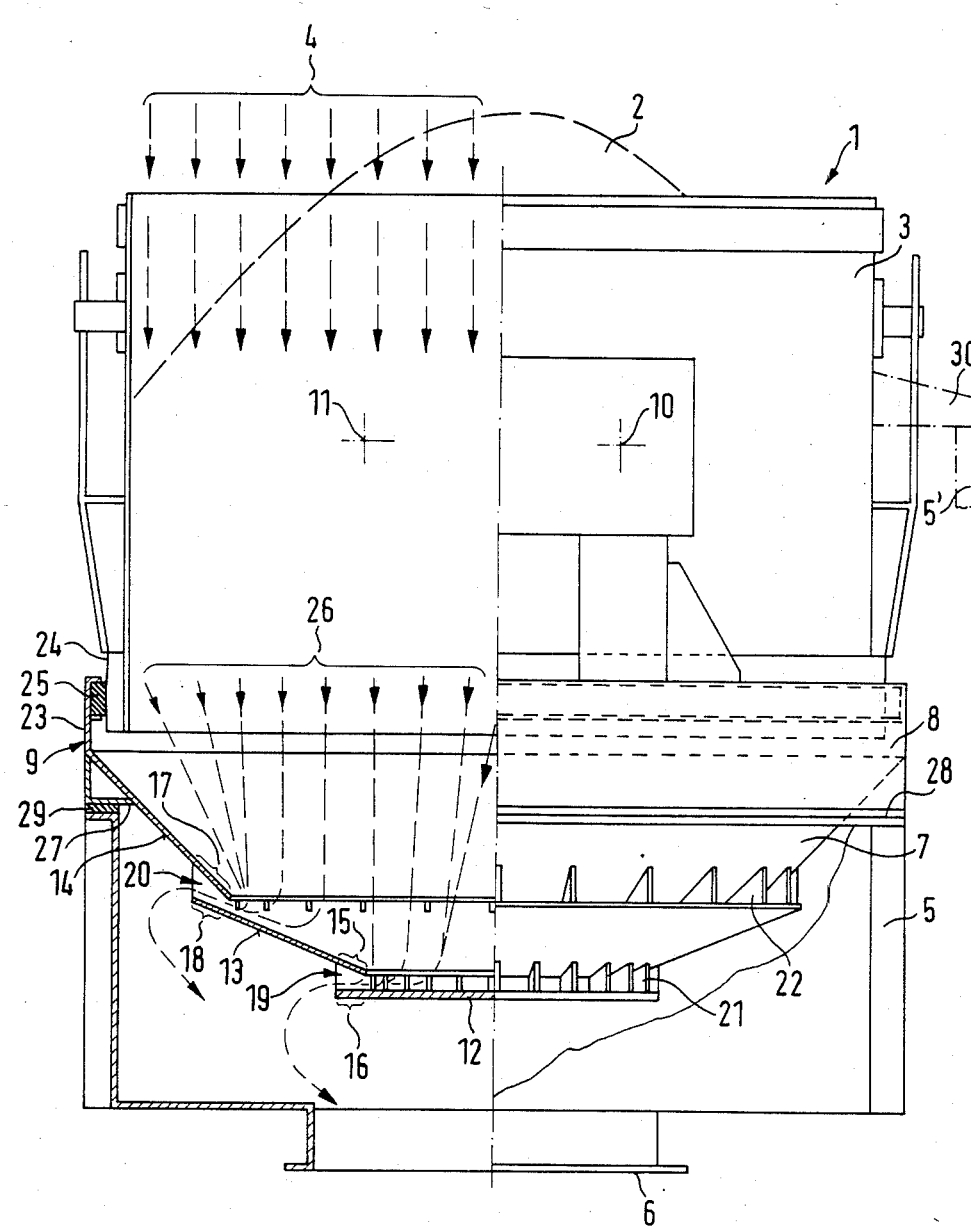

FURNACE CHARGE PREHEATER

BACKGROUND OF THE INVENTION

The invention relates to a furnace charge preheater in the form of a bucket for receiving the charge material to be heated by means of a heating gas, especially one to be used for scrap metal, having a bottom containing at least two half-shells which can be swung apart, within which bottom an annular gap is provided for the passage of hot gases.

A furnace charge preheater of this kind has been disclosed, for example, in DE-A1-No. 30 38 515. It can be used to preheat furnace charge materials such as scrap, ore, sponge iron, alloys, slag making material, etc., before they are charged into a melting furnace or converter, or into a roasting furnace. For the preheating of the charge material, hot exhaust gases from the melting furnace, for example, are passed through the charge preheater.

The charge preheater is constructed preferably as a scrap bucket having a bottom consisting of at least two hinged parts which can separate to drop its load, and in the bottom part of the bucket openings must be provided for the passage of the hot gases. In the known furnace charge preheater, when the bottom is in the closed state, an annular gap is provided between the outside of the bucket and the hinged bottom. After it is filled with the cold charge material, the bucket is placed with its bottom part in a chamber, and the chamber is sealed off above the annular gap between the wall and bottom of the bucket by means of two half-lids having semicircular cutouts. The top opening of the bucket is closed off by means of a hood. The hood is connected to the exhaust of a source of hot gas, and the chamber is connected to a filter house or exhaust stack with the interposition of a blower if desired. The hot exhaust gas is thus fed downwardly through the charge preheater, and it heats the charge and exits through the tightly closed chamber. It would also be possible to feed the hot gases through the chamber and exhaust the cooled gases from the hood placed on the preheater.

After the charge has been heated, the hood is swung aside, and the preheater can then be removed from the chamber and dumped into the melting furnace by swinging the bottom half-shells apart.

To achieve uniform heating of the charge in the known furnace charge preheater, vertical passages with downwardly directed gas outlets are distributed circumferentially about the inside wall of the bucket, and the bucket is filled with the use of an armature by which a passage is formed in the central part of the charge.

In a furnace charge preheater of the kind described above, it is the object of the invention to achieve a uniform flow of the hot gas through the charge materials without the need for additional procedures in loading the bucket.

BRIEF DESCRIPTION OF THE INVENTION

This object is achieved by the following features in the closed state of the bucket bottom:

(a) The bucket bottom is formed of a central part and at least one annular part, (b) The inner margin of the annular part overlaps the margin of the central part, (c) The margin of the central part is located beneath the inner margin of the annular part at a distance therefrom, forming an annular gap.

In accordance with the invention, when the bucket bottom is in the closed state at least an annular gap is provided in the bottom for the passage of the hot gas, and is such that particles of the charge material cannot become trapped in it. Instead of a continuous annular gap, an interrupted annular gap can be provided. By providing one or more annular gaps or interrupted annular gaps in the bucket bottom, the flow path of the hot gases through the bucket can be made such that they will flow uniformly through the charge in the vertical direction. Of course, in this case care must be taken to see that a free space extending across the entire inside cross section of the bucket is provided above the surface of the charge beneath the hood that is to be placed over the bucket, so that the gas can enter or, if it is fed from the bottom, so that it can exit, uniformly over the entire cross section.

It is basically also possible to provide an annular gap between the bucket wall and the outer edge of the parts forming the bottom, as is done in the known furnace charge preheater. According to an advantageous further development of the invention, however, the outer edge of the bucket bottom in the closed state of the bottom parts closes tightly against the bucket wall, and a shoulder is provided on the outermost rim of the bucket bottom for resting the bucket on the rim of the chamber. In this manner it is simultaneously possible to solve in a particularly advantageous manner the problem of sealing the bucket against the chamber without the need, after inserting the bucket into the chamber, to bring half-covers with semicircular cutouts against the bucket wall or to provide for other sealing measures which would require substantial modification of the known scrap buckets. The solution offered by the invention permits the simple conversion of existing scrap buckets (only the bottom is made differently) without the need for fundamental modifications of the bucket body and the components installed thereon, and without the need for any substantial increase in the outside dimensions of the scrap bucket for purposes of air-tight sealing. In the solution offered by the invention, the chamber can be made substantially smaller.

DESCRIPTION OF A PREFERRED EMBODIMENT

The invention will be further explained with the aid of an embodiment in conjunction with a drawing.

BRIEF DESCRIPTION OF THE DRAWING

The drawing presents a divided elevational view of a furnace charge preheater of the invention, half in cross section.

The furnace charge preheater 1 shown in the drawing, for containing the charge material 2 which is to be heated by means of hot gas, can be used, for example, in an installation such as that described in DE-OS No. 30 38 515. The furnace charge preheater is constructed in the form of an open-top bucket 3 on which a hood (not shown) connected with the hot gas source can be placed in an air-tight manner such that a free space is formed within the bucket above the charge and beneath the hood, so that hot gas entering downwardly through the hood will be distributed approximately uniformly across the cross section of the charge. The flow of the hot gases is indicated by the arrows 4 in the cross-sectional part of the drawing. The lower part of the bucket 3 is situated in a chamber 5 which has a gas outlet 6. This outlet communicates through ductwork and a blower with a chimney or the like.

The bucket 3 is closed by the clamshell 7 which consists of two hinged half-shells 8 and 9 which can be swung apart. The hinge axis of the right half-shell 8 is indicated at 10, the hinge axis of the left half-shell 9 at 11. The half-shells are swung out in a known manner, for example by means of chains, which are attached to the edges of the clamshell as in the case of a conventional scrap bucket.

When the bucket bottom is closed, i.e., when in the state represented in the drawing, the bucket bottom has a central part 12 and two annular parts, namely an inside ring 13 and an outside ring 14. The inner margin 15 of the inside ring 13 overlaps the margin 16 of the central part 12. Furthermore, the inner margin 17 of the outside ring 14 overlaps the outer margin 18 of the inside ring 13. The overlapping margins are in each case held apart such that each pair of overlapping margins forms an annular gap 19 and 20, respectively. To preserve this spacing, radially oriented fins 21 and 22 are provided between the overlapping margins. It is to be noted that, in the present case, the charge preheater has a round cross section like a conventional scrap bucket, although this is not an essential condition. In the case of other cross-sectional shapes it may be desirable to align the fins differently and even to distribute them nonuniformly about the circumference.

In the furnace charge preheater being described, the outside margin of the outermost bottom ring 14 is turned up and a gasket 25 is provided between the turned-up margin 23 and the outside 24 of the bucket 3. The gasket is fastened to the turned-up margin 23, so that it will be less exposed to thermal stress when the furnace is being charged than it would if it were fastened to the outer wall of the bucket.

On account of the gasket at the location specified, the hot gases entering downwardly into the charge (see arrows 4) are forced to leave the charge at the bottom through the annular gaps 19 and 20. A substantially uniform distribution of the flow over the cross section is thus obtained. The flow in the bottom part of the container is indicated by arrows 26 in the left half of the drawing. Since the hot gases thus leave the furnace charge preheater only at the bottom, it is possible, in accordance with a further development of the invention, to provide a shoulder 27 on the outermost ring 14 whereby the bucket 3 can be rested on the rim 28 of the chamber 5. This eliminates the need for sealing the chamber off by means of special lids. When the charge preheater 1 has been placed on this chamber 5, the latter is sealed tight. If necessary, a gasket 29 can be provided between the shoulder 27 and the rim 28.

The furnace charge preheater, however, can also have an annular gap between the edge of the bottom and the outside 24 of the bucket 3 in addition to the gas openings provided in the bottom 7. In the charge preheater represented in the drawing, the gasket 25 would then be unnecessary, and a portion of the downwardly flowing hot gases would emerge through the annular gap between the turned-up margin 23 and the outside 24 of the bucket 3. To include this part of the gases in the heating gas circuit, the chamber 5 has to be enlarged and it has to be sealed above the annular gap.

Such sealing can be accomplished, as indicated in broken lines on the right side of the drawing, for example by providing an annular flange 30 on the bucket and placing this flange on the rim of the enlarged chamber 5'. A gasket in the area of the hood of the furnace charge preheater is also conceivable.

In the embodiment represented in the drawing, the rings 13 and 14 are of a truncoconical configuration. This is especially desirable for reasons of ease of manufacture. Of course, other configurations, such as spherical segments, are also possible in the designing of the bucket bottom 7. Furthermore, the annular gaps 16 and 20 do not need to extend about the entire circumference; it is sufficient for them to cover portions of the circumference. They can also be offset from one another It is always important, however, that the gas ports be designed such that the charge material will not be trapped in them.

We claim:

1. Furnace charge preheater comprising a bucket for receiving charge material to be heated by means of a heating gas, said bucket having a bottom containing at least two half-shells adapted to be swung apart to an open position and swung together to a closed position, and wherein in the closed position of the bucket bottom, said bucket bottom has a central part having an outer edge portion, and at least one ring, the ring having an inner edge portion which overlaps said outer edge portion of the central part, and said outer edge portion of the central part being located beneath the inner edge portion of the ring at a distance therefrom, forming an annular gap for the passage of hot gases.

2. Furnace charge preheater comprising a bucket for receiving charge material to be heated by means of a heating gas, said bucket having a bottom containing at least two half-shells adapted to be swung apart to an open position and swung together to a closed position, and wherein in the closed position of the bucket bottom, said bucket bottom has a central part, an inner annular part, the inner annular part having an inner margin which overlaps an outer margin of the central part, and said outer margin of the central part being located beneath the inner margin of the annular part at a distance therefrom, forming an annular gap for the passage of hot gases, and said bucket bottom has an outer annular part adjacent to the inner annular part, said outer annular part having an inner margin which overlaps an outer margin of the inner annular part, and said inner margin of the outer annular part being located above the outer margin of the inner annular part at a distance, forming another annular gap.

3. Furnace charge preheater according to claim 2, wherein said annular parts are of a truncoconical configuration.

4. Furnace charge preheater according to claim 2, wherein radially aligned fins are provided between the overlapping margins.

5. Furnace charge preheater according to claim 2, wherein the annular parts are each divided into a plurality of annular pieces.

6. Furnace charge preheater according to claim 2, wherein the outer annular part has an outer margin which is closely adjacent to a wall of the bucket, and there is provided a shoulder on the outer annular part which is placed on a rim of a chamber in which the lower part of the bucket is located.

7. Furnace charge preheater according to claim 6, wherein the outer margin of the outer annular part is turned up, and there is provided a gasket between the turned up margin and the outside of the bucket.

8. Furnace charge preheater according to claim 6 or 7 wherein a gasket is provided between the shoulder and the rim.

* * * * *